United States Patent
Ogawa et al.

(10) Patent No.: US 7,038,006 B2
(45) Date of Patent: May 2, 2006

(54) POLYAMIDE AND RESIN COMPOSITION

(75) Inventors: Shun Ogawa, Hiratsuka (JP); Satoshi Yoshinaka, Hiratsuka (JP); Takeo Hayashi, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 30 days.

(21) Appl. No.: 10/678,227

(22) Filed: Oct. 6, 2003

(65) Prior Publication Data

US 2004/0068090 A1 Apr. 8, 2004

(30) Foreign Application Priority Data

Oct. 8, 2002 (JP) ............... 2002-295236
Sep. 3, 2003 (JP) ............... 2003-311644

(51) Int. Cl.
*C08G 69/26* (2006.01)
*C08G 69/28* (2006.01)
*C08K 3/00* (2006.01)

(52) U.S. Cl. ............ 528/310; 528/332; 528/335; 528/336; 528/347

(58) Field of Classification Search ............ 528/310, 528/335, 336, 332, 347
See application file for complete search history.

(56) References Cited

U.S. PATENT DOCUMENTS

| | | | | |
|---|---|---|---|---|
| 4,163,101 A | | 7/1979 | Schade et al. ............ 528/347 |
| 4,921,932 A | * | 5/1990 | Tamura et al. ............ 528/339.3 |
| 5,670,608 A | * | 9/1997 | Oka et al. ............ 528/322 |
| 5,807,968 A | * | 9/1998 | Heinrich et al. ............ 528/310 |
| 6,166,171 A | * | 12/2000 | Yamamoto et al. ............ 528/310 |
| 6,291,633 B1 | * | 9/2001 | Nakamura ............ 528/310 |
| 6,297,345 B1 | * | 10/2001 | Okushita et al. ............ 528/170 |
| 6,444,739 B1 | * | 9/2002 | Yamamoto et al. ............ 524/404 |
| 6,812,322 B1 | * | 11/2004 | Bever et al. ............ 528/310 |
| 2004/0068090 A1 | * | 4/2004 | Ogawa et al. ............ 528/335 |

FOREIGN PATENT DOCUMENTS

EP 0 334 667 9/1989
EP 0 347 597 12/1989

* cited by examiner

*Primary Examiner*—P. Hampton Hightower
(74) *Attorney, Agent, or Firm*—Wenderoth, Lind & Ponack, L.L.P.

(57) ABSTRACT

A polyamide obtained by polycondensation of a diamine component containing at least 50 mol % of 2-methyl-1,5-pentanediamine and a dicarboxylic acid component containing at least 50 mol % of azelaic acid,
comprising the following properties of (1) to (4),
(1) when a stretched film is polarized in an electric field of 200 MV/m, a remanent polarization is at least 30 mC/m$^2$,
(2) the relative viscosity of a 1 g/dl solution of the polyamide in 96% concentrated sulfuric acid at 25 °C. is 1.3 to 5.0,
(3) the glass transition temperature is 80° C. or less and a calorific value at a cooling crystallization exotherm peak is 5 J/g or less, and
(4) it is soluble in an amount of at least 5 mass % at 25 °C. in at least one selected from methanol, ethanol and 2-propanol,
and a resin composition containing the above polyamide and an electrically conductive material.

11 Claims, No Drawings

US 7,038,006 B2

POLYAMIDE AND RESIN COMPOSITION

FIELD OF THE INVENTION

The present invention relates to a polyamide and a resin composition containing the above polyamide and an electrically conductive material. More specifically, it relates to a novel polyamide which has ferroelectricity and is soluble in a general-purpose solvent and useful for applications such as a sensor, an actuator or a memory, and a resin composition containing the above polyamide and an electrically conductive material which is useful as a damping material or a noise absorption and insulation material and has high damping properties, i.e., high properties of converting a vibrational energy from outside sources into a heat energy and thereby damping the vibrational energy.

PRIOR ARTS OF THE INVENTION

Ferroelectric polymers are used for various sensors, ultrasonic probes and actuators owing to their piezoelectricity and pyroelectricity. For example, polyvinylidene fluoride-based polymers are widely used since their piezoelectricity is large. However, the polyvinylidene fluoride-based polymers are expensive and a specific crystal form brings about ferroelectricity, so that there is a limitation in producing a molded article exhibiting ferroelectricity.

In addition to the polyvinylidene fluoride-based polymers as a ferroelectric polymer, for example, it is known that some polyamides have ferroelectricity. The polyamide type ferroelectric polymers are reasonable as compared with the polyvinylidene fluoride-based polymers. There is a demand for a polyamide film having a stronger ferroelectricity. As a polyamide type ferroelectric polymer, there are known Nylon 7, Nylon 11 as an odd number nylon (for example, Lee et al., Ferroelectric Polarization Switching in N-11, J. Polym. Sci., Polym. Phys., vol.29, p.273–277 (1991), Lee et al., Effect of Annealing on the Ferroelectric Behavior of N-11 and N-7, J. Polym. Sci., Polym. Phys., vol.29, p. 279–286 (1991)), polyheptamethylene hexafluoroglutamide and polypentamethylene hexafluoroglutamide (for example, Ohtani et al., Ferroelectricity of an odd polyamide and an odd polyurea, Proceeding of The Society of Polymer Science, Japan, vol.41, p. 4,559 (1992)). The ferroelectricity of these is in relation to a crystal region. Of these polyamide type ferroelectric polymers, Nylon-11 is relatively cheap, while it has a problem that the appearance of ferroelectricity is unstable.

Further, it is reported that polyamides having an aromatic ring or an aliphatic ring, such as polymetaxylylene adipamide, a hexamethylene terephthalamide/isophthalamide copolymer, poly(1,3-cyclohexylenedimethylene adipamide), have large ferroelectricity and can exhibit their ferroelectricity stably (JP-A-8-302036).

Further, as for an application of the ferroelectric polymer, it is required to form a thinner film particularly in an electronics field such as a sensor or a ferroelectric memory, and it is necessary to form a film from a solution. However, these polyamides are low in solubility in an organic solvent. For example, these polyamides are soluble in only a specific polar solvent such as phenol, trichloroacetic acid or 1,1,1, 3,3,3-hexafluoro-2-propanol. For this reason, there is a problem that, when a film is formed from a solution, it is required to use a high-boiling solvent having corrosivity or an extremely expensive solvent.

Furthermore, multi-component copolymers using as a monomer ε-caprolactam, ω-laurolactam, hexamethylenediamine, adipic acid or sebacic acid, are produced as an alcohol-soluble polyamide, while each of the multi-component copolymers does not have a large ferroelectricity.

Further, polyamides using 2-methyl-1,5-pentanediamine and azelaic acid as part of raw materials have been already disclosed (JP-A-52-155698, JP-A-2-70724, JP-A-5-320416, U.S. Pat. No. 5,321,120, and JP-A-11-200253). None of these publications disclose a polyamide using 2-methyl-1, 5-pentanediamine and azelaic acid as main components and have any description concerning the ferroelectricity. Practically, the polyamides disclosed in the above publications do not have a practically effective ferroelectricity or solvent solubility.

On the other hand, conventionally, a soft vinyl chloride-based resin obtained by adding a plasticizer to a vinyl chloride-based resin is known as a material absorbing a vibrational energy, such as a damping material. The above soft vinyl chloride-based resin aims to consume a vibrational energy as a frictional heat in the resin and thereby damp the vibrational energy. However, sufficient absorption and damping of vibrations can not be attained.

Further, rubber materials, such as isobutylene-isoprene rubber or NBR, excellent in view of processability, mechanical strength and material costs are largely used as a damping material. However, although the above rubber materials are the most excellent in damping properties (insulation performance of transmission of vibrational energy, or relaxation performance of transmission of vibrational energy) in general polymers, they are insufficient in damping properties when the rubber material is singly used as a damping material. For example, for damping of buildings or machinery and tools, the rubber materials have been used in the form of a composite such as a laminate obtained by laminating the rubber material and a steel plate or a damping structure obtained by combining the rubber material with a lead core or an oil damper each of which absorbs the vibrational energy by plastic deformation.

The rubber material as a conventional damping material can not be used singly, as is described above, and it is required to form a composite thereof. For this reason, its vibration isolating structure is complicated inevitably. Therefore, it is required that the damping material itself and the rubber material itself have high damping properties.

Further, there are disclosed compositions comprising a polymer material and a piezoelectric powder material as main components (JP-A-60-51750, JP-A-3-188165, and Inaba et al., Relation between the dynamic properties and the damping performance of a piezoelectric damping composite material, Nippon Gomu Kyokaishi, vol.67, p.564 (1994)). The composition of a polymer material and a piezoelectric powder material converts vibrational energy into electric energy by piezoelectricity and consumes the generated electric energy by Joule's heat, to absorb and damp the vibration. However, when the composition does not contain 50 mass % or more of piezoelectric particles, a sufficient effect can not be obtained. However, when the piezoelectric particles in such an amount are contained in the composition, the composition becomes low in fluidity under a molten state and kneading or molding are difficult. Further, since ceramics such as lead zirconate titanate or barium titanate are used in the piezoelectric particles, there is a defect that the mass is large.

Further, there are proposed films for a damping material which comprise a piezoelectric film and a conductor layer formed on the surface of the film (JP-A-5-87186) However, only films of a polyvinylidene fluoride-based polymer are supplied for practical uses as the piezoelectric film. The polyvinylidene fluoride-based polymer is expensive. In addition, the film formation thereof is difficult and there is difficulty in producing large-area films in large quantities. Therefore, the above films have not yet reached practical uses as a film for a damping material. Further, as an example using a low-price piezoelectric film whose film formation is easy, there is also proposed a damping material comprising a piezoelectric film using a polyamide-based polymer (JP-A-8-305369, JP-A-9-309962). However, a polarization treatment is required for imparting piezoelectricity to the film, so that a special device is needed for its production, which increases the production cost.

Further, there is disclosed a damping material containing an active ingredient which increases the amount of dipole moment in a polymer base material (JP-B-3318593, JP-B-3192400, Inoue et al., Damping behavior of chlorinated polyethylene/N,N'-dicyclohexyl-2-benzothiazolylsulfenamide-based organic hybrid, Sen'i Gakkaishi, vol.56, p.443 (2000)). However, the active ingredient used in the above material is a low molecular weight compound and there is a defect that it leaks out from the base material in use and the performance decreases.

SUMMARY OF THE INVENTION

It is an object of the present invention to provide a polyamide which has large ferroelectricity and is excellent in solubility in a general-purpose solvent.

It is another object of the present invention to provide a material which comprises a polymer material as a main component, is easy to produce, is lightweight and has higher damping properties.

According to the present invention, there is provided a polyamide obtained by polycondensation of a diamine component containing at least 50 mol % of 2-methyl-1, 5-pentanediamine and a dicarboxylic acid component containing at least 50 mol % of azelaic acid, comprising the following properties of (1) to (4), (1) when a stretched film is polarized in an electric field of 200 MV/m, a remanent polarization is at least 30 mC/m$^2$, (2) the relative viscosity of a 1 g/dl solution of the polyamide in 96% concentrated sulfuric acid at 25° C. is 1.3 to 5.0, (3) the glass transition temperature, measured with a differential scanning calorimeter, of the polyamide is 80° C. or less and a calorific value at a cooling crystallization exotherm peak is 5 J/g or less, and (4) the polyamide is soluble in an amount of at least 5 mass % at 25° C. in at least one member selected from the group consisting of methanol, ethanol and 2-propanol.

According to the present invention, further, there is provided a resin composition containing the above polyamide and an electrically conductive material. The above resin composition preferably has a volume resistivity of $10^{12}$ Ω·cm or less.

DETAILED DESCRIPTION OF THE INVENTION

The present inventors have made diligent studies for overcoming the above object and found that the above object can be overcome by a polyamide which has a specific structure, has a specific remanent polarization, a specific solution viscosity, a specific glass transition temperature and a specific calorific value at a cooling crystallization exotherm peak, and is soluble in a general-purpose solvent. Accordingly, the present inventors have reached to the present invention.

On the other hand, the present inventors have made studies on the basis of the idea that, when an electrically conductive material is dispersed in a ferroelectric polymer, the ferroelectric polymer can exhibits high damping properties based on piezoelectricity in a minute unit without any appearance of a macro piezoelectricity by a polarization treatment. As a result thereof, the present inventors have found that a composition obtained by dispersing an electrically conductive material in a polyamide having a specific structure and having an excellent performance as a ferroelectric polymer does not require the polarization treatment, is excellent in moldability, is reasonable and has high damping properties, and reached to the present invention. The resin composition according to the present invention is suitable for a vibration isolating material or a noise absorption and insulation material for various machinery or building structures and vehicle and airframe structures.

The ferroelectric polyamide of the present invention comprises 2-methyl-1,5-pentanediamine as a main diamine component and azelaic acid as a main dicarboxylic acid component. It is required that the polyamide contains at least 50 mol % of the 2-methyl-1, 5-pentanediamine component and at least 50 mol % of the azelaic acid component. It is preferred that the polyamide contains at least 70 mol % of the 2-methyl-1,5-pentanediamine component and at least 70 mol % of the azelaic acid component. Most preferably, the polyamide contains at least 90 mol % of the 2-methyl-1,5-pentanediamine component and at least 90 mol % of the azelaic acid component. When either of the above components is less than 50 mol %, the ferroelectricity is low and a sufficient performance can not be obtained or it is poor in solubility in a general-purpose solvent.

A diamine component other than 2-methyl-1,5-pentanediamine may be used in an amount of less than 50 mol % based on the entire diamine component. Examples of the diamine other than 2-methyl-1,5-pentanediamine, used in the present invention, include 1,4-butanediamine, 1,5-pentanediamine, 1,6-hexanediamine, 1,7-heptanediamine, 1,8-octanediamine, 1,9-nonanediamine, 1,10-decanediamine, 1,12-dodecanediamine, 2,2,4-trimethyl-1,6-hexanediamine, 2,4,4-trimethyl-1,6-hexanediamine, metaxylylene diamine, paraxylylene diamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, isophorone diamine, paraphenylene diamine, metaphenylene diamine, bis(4-aminophenyl)ether and bis(4-aminophenyl)methane.

A dicarboxylic acid other than azelaic acid may be used in an amount of less than 50 mol % based on the entire dicarboxylic acid component. Examples of the dicarboxylic acid other than azelaic acid, used in the present invention, include glutaric acid, adipic acid, pimelic acid, suberic acid, sebacic acid, undecanedioic acid, dodecanedioic acid, brassilic acid, terephthalic acid, isophthalic acid, phthalic acid, 2-methylterephthalic acid, naphthalenedicarboxylic acid, biphenyldicarboxylic acid, benzophenonedicarboxylic acid, tetralindicarboxylic acid, decalindicarboxylic acid, 1,3-cyclohexanedicarboxylic acid, 1,4-cyclohexanedicarboxylic acid, norbornanedicarboxylic acid, tricyclodecanedicarboxylic acid, pentacyclododecanedicarboxylic acid, isophoronedicarboxylic acid and polymerized fatty acid.

Further, an amide bond-formable compound such as aminocarboxylic acid may be used in an amount of less than 50 mol % based on the total of amino bond repeating units.

Examples of the amide bond-formable compound such as aminocarboxylic acid, used in the present invention, include γ-butyrolactam, δ-valerolactam, ε-caprolactam, ω-laurolactam, 5-aminopentane acid, 6-aminohexane acid, 7-aminoheptane acid, 8-aminooctane acid, 9-aminononane acid, 10-aminodecane acid, 11-aminoundecanoic acid and 12-aminododecanoic acid.

Of the above copolymerization components, 1,5-pentanediamine, 1,7-heptanediamine, 1,9-nonanediamine, met-axylylene diamine, 1,3-bis(aminomethyl)cyclohexane, glutaric acid, suberic acid, undecanedioic acid, isophthalic acid, 1,3-cyclohexanedicarboxylic acid and 1'-aminoundecanoic acid are particularly preferred. When the polyamide of the present invention is a copolymer containing at least one of them, it shows a large ferroelectricity. Further, when the amount of the copolymerization component in each of the dicarboxylic acid component and the diamine component is less than 10 mol %, i.e., the amount of 2-methyl-1,5-pentanediamine in the diamine component and the amount of azelaic acid in the dicarboxylic acid component are 90 mol % or more respectively, a larger ferroelectricity is shown.

The molar ratio of a diamine component unit and a dicarboxylic acid unit constituting the polyamide of the present invention is in the range of 1:0.9 to 1:1.1, preferably 1:0.95 to 1:1.05. When the molar ratio is in the above range, the polyamide exhibits ferroelectricity and is excellent in solvent solubility and moldability.

The polyamide of the present invention, as a ferroelectric polymer, has a remanent polarization of 30 mC/m$^2$ or more when a stretched film is polarized in an electric field of 200 MV/m. When the remanent polarization is 30 mC/m$^2$ or more, the polyamide has a practical value as a ferroelectric material.

The relative viscosity of a 1 g/dl solution of the polyamide of the present invention in 96% concentrated sulfuric acid at 25° C. is 1.3 to 5.0. When the relative viscosity is in the above range, the polyamide exhibits ferroelectricity and is excellent in solvent solubility and moldability.

The polyamide of the present invention has a glass transition temperature, measured with a differential scanning calorimeter, of 80° C. or less, and the calorific value, at a cooling crystallization exotherm peak, of the polyamide is 5 J/g or less. The polyamide of the present invention is a ferroelectric polymer whose non-crystalline part contributes to the ferroelectricity. In such a ferroelectric polymer, a coercive field decreases as the glass transition temperature decreases. Therefore, when the glass transition temperature is 80° C. or less, the ferroelectricity is easily exhibited. Further, for showing a large ferroelectricity, it is required that the polyamide of the present invention is non-crystalline or low-crystalline. When the calorific value at a cooling crystallization exotherm peak is 5 J/g or less, sufficiently large ferroelectricity is shown and the large ferroelectricity can be retained even after a heat treatment is carried out.

The polyamide of the present invention is soluble in an amount of at least 5 mass % at 25° C. in at least one member selected from methanol, ethanol and 2-propanol. It is more preferred that the polyamide of the present invention is soluble in methanol, and processing such as a film formation using a solution of the polyamide becomes easy.

The method of producing the polyamide of the present invention is not specially limited and it can be produced by a known method.

Depending upon the production methods, a dicarboxylic acid derivative, such as a dicarboxylic acid ester, a dicarboxylic acid chloride, an active acyl derivative or dinitrile, in addition to the dicarboxylic acid can be used as a raw material in the dicarboxylic acid component. Further, in addition to the diamine, a diamine derivative such as N-acetyldiamine, diisocyanate or N-silylated diamine may be used in the diamine component.

An example of the production method of the polyamide of the present invention is shown below. A diamine component containing at least 50 mol % of 2-methyl-1,5-pentanediamine, a dicarboxylic acid component in an amount almost equimolar to the amount of the diamine component containing at least 50 mol % of azelaic acid, and water are placed in an autoclave and temperature-increased up to 160° C. to 280° C., preferably 190° C. to 250° C., and maintained under a steam pressurization for a predetermined time, to progress an amidation reaction. Then, while releasing the steam and returning to normal pressure by opening an exhaust valve, the temperature of the inside is temperature-increased up to 200° C. to 290° C., preferably 220 to 280° C. The contents in the autoclave are retained for a predetermined period of time, and then a polyamide is taken out. Instead of the addition of each of the diamine component and aliphatic dicarboxylic acid component as an individual, these components may be added in the form of nylon salt. When it is required to increase the molecular weight further, the molecular weight can be increased by subjecting a polyamide obtained by melt polymerization to solid phase polymerization.

A variety of additives such as a polymerization catalyst, an antioxidant, a thermal stabilizer, an ultraviolet absorber and an antistatic agent, may be added to the polyamide of the present invention before and after the polymerization reaction.

The polyamide of the present invention is useful as a ferroelectric polymer for applications such as a sensor, an actuator, a memory, alight control devise, a storage material, a damping material and a noise absorbing material. Furthermore, the polyamide of the present invention is also useful as a fiber, a sheet, a film, an injection molding material, a coating composition, an adhesive, and the like.

Depending on the applications, the polyamide of the present invention may contain an inorganic filler such as a glass fiber, a carbon fiber, talc, mica or carbon and other polymers.

The resin composition of the present invention contains the above ferroelectric polyamide and an electrically conductive material. The electrically conductive material controls a resistance value and an electric energy generated in the ferroelectric polymer is converted into a heat energy with high efficiency and consumed, so that high damping properties are exhibited. As the ferroelectric polyamide, one or at least two polyamides of the present invention are used. A known material can be used as the electrically conductive material. For example, the above material includes inorganic electrically conductive materials and organic electrically conductive materials. The inorganic electrically conductive materials include a metal powder or a metal fiber of copper, copper alloy, silver, nickel and a low melting alloy, fine particles of copper or silver covering a noble metal, fine particles or whiskers of metallic oxides such as stannic oxide, zinc oxide and indium oxide, electrically conductive carbon powders such as various carbon blacks and carbon nanotubes, and carbon fibers such as a PAN type carbon fiber, a pitch type carbon fiber and a vapor growth graphite. The organic electrically conductive materials include a low molecular weight surfactant type antistatic agent, a high molecular weight type antistatic agent, electrically conductive polymers such as polypyrrole and polyaniline, and fine particles of a polymer covering a metal. Further, the inorganic electrically conductive material and the organic electrically conductive material may be used in combination. The mixing ratio of the ferroelectric polymer and the electrically conductive material is preferably controlled such that the volume resistivity of the resin composition is $10^{12}$ Ω·cm or less. When the volume resistivity is $10^{12}$ Ω·cm or less, an electric energy generated by an electromechanical transduction action can be efficiently consumed by Joule's heat. The volume resistivity in the present invention is measured according to the method of JIS K 6911.

The resin composition of the present invention comprises the polyamide having ferroelectricity and the electrically conductive material as main components, while it is not limited to a resin composition composed only of the ferroelectric polyamide and the electrically conductive material. A filler which exhibits a damping effect by friction maybe added for the purpose of improving the resin composition in vibrational energy absorption. The filler includes mica flakes, glass pieces, a glass fiber, a carbon fiber, calcium carbonate, barite and precipitated barium sulfate. The amount of the filler to be added, based on the entire resin composition, is preferably 10 to 80 mass %. The resin composition of the present invention may contain at least one additive, such as a dispersant, a compatibilizing agent, a surfactant, an antistatic agent, a lubricant, a plasticizer, a flame retardant, a crosslinking agent, an antioxidant, an age resistor, a weather-resistant agent, a heat-resistant agent, a processing aid, a brightener, a coloring agent (pigment, dye), a foaming agent and a foaming aid, as required, so long as the effects of the present invention are not impaired. The amount of the additive to be added, based on the entire resin composition, is preferably 0 to 60 mass %. Further, blending with a different resin or a surface treatment after molding may be carried out so long as the effects of the present invention are not impaired.

The resin composition of the present invention is obtained by mixing the ferroelectric polyamide and the electrically conductive material and optionally mixing the filler and other additives. For the production, a known melting and mixing apparatus such as a heat roll, a Banbury mixer, a twin screw kneader or an extruder may be used. Further, there may be adopted a method in which the above ferroelectric polyamide is solved in or swelled with a solvent, the electrically conductive material and optionally the filler is/are mixed and then drying is carried out or a method in which each of the components is mixed in the form of fine powder.

The composition of the present invention is usable as a damping material or a noise absorption and insulation material in the form of an injection molded article, a sheet, a film, a fiber, a foam, an adhesive, a coating composition, a sheet of constrained type or a sheet of unconstrained type. Further, it can be preferably used as a damping material or a noise absorption and insulation material for vehicles, railways, aircrafts, home electric appliances, OA equipment, precision mechanical equipment, constructional machineries, civil engineering and construction buildings, shoes and sporting goods.

EXAMPLES

Examples of the polyamide will be shown hereinafter, while the present invention shall not be limited to these Examples. Measurements of physical properties were carried out by the following methods.

(1) Remanent Polarization

Polyamide was molten and molded according to a known method, to obtain a film having a thickness of about 50 to 300 μm. The above film was stretched biaxially at the same time or uniaxially. Then, the stretched film was heat-treated at a temperature which was not less than a glass transition temperature and was not more than a melting point for 10 to 30 seconds while retaining the tension state of the stretched film, to obtain a stretched film. Aluminum was vacuum evaporated on each surface of the obtained stretched film by using a vacuum evaporator to obtain electrodes. 0.1 Hz of a sinusoidal electric field at a maximum of 200 MV/m was applied between the above electrodes on both the film surfaces. At this time, an electric displacement D obtained by integrating a flowing electric current by a charge amplifier was measured and the electric displacement D was plotted with regard to an electric field E. The value of D when E=0 was obtained from its hysteresis curve, to determine a remanent polarization.

(2) Relative Viscosity

The relative viscosity ($\eta r$) of polyamide was measured by placing a 1 g/dl solution of the polyamide in 96% sulfuric acid under a constant temperature of 25° C. and using a Cannon-Fenske type viscometer.

(3) Melting point, Glass transition temperature, and Calorific value at a cooling crystallization exotherm peak The melting point (Tm) of polymer was measured with a DSC/TA-50WS type differential scanning calorimetry supplied by SHIMAZU Corporation. About 10 mg of a sample after crystallization and drying was placed in an unsealed container made of aluminum and measured for melting point under a nitrogen gas current (30 ml/minute) at a temperature-increasing rate of 10° C./minute. The glass transition temperature was measured as follows. After the measurement of the above Tm, the sample was temperature-increased up to 270° C. at a temperature-increasing rate of 10° C./minute, retained for 3 minutes, then rapidly cooled, and again temperature-increased at a temperature-increasing rate of 10° C./minute, to measure the glass transition temperature. Further, the calorific value at a cooling crystallization exotherm peak (to be referred to as "ΔHc" hereinafter) was obtained from the area of an exotherm peak which appeared when the sample was temperature-decreased at a temperature-decreasing rate of 5° C./minute after it was temperature-increased up to 270° C. at a temperature-increasing rate of 10° C./minute and retained at 270° C. for 3 minutes.

(4) Solubility

The solubility of 5 mol % of polyamide in each of methanol, ethanol and 2-propanol, as a solvent, was measured. 0.5 g of a polymer pellet or a pulverized substance and 9.5 g of a solvent was added to a 50 ml Erlenmeyer flask equipped with a condenser tube, and refluxed under heat at the boiling point of the solvent for 30 minutes while stirring with a magnetic stirrer. Then, the stirred mixture was cooled to 25° C. and the dissolution state was judged by visual observation. The solubility was evaluated according to the following standard.

◯: Most of the polyamide was dissolved and, 24 hours later after the cooling, a solution state was still retained.

Δ: The polyamide was dissolved once but it precipitated within 1 hour after the cooling.

×: Not dissolved.

Example 1

726.4 g (6.25 mol) of 2-methyl-1,5-pentanediamine (supplied by DuPont) as a diamine, 1176.5 g of azelaic acid (supplied by Tokyo Kasei Kogyo Co., Ltd., purity 99 mol % or more) as an equimolar dicarboxylic acid, and 480 g of distilled water were placed in a reactor pot equipped with a stirrer, a partial condenser, a thermometer and a nitrogen gas-introducing tube and having an internal volume of 5 liters, and nitrogen substitution was sufficiently carried out. After the reaction pot was tightly closed, the internal temperature was increased up to 215–220° C. and the internal pressure was increased up to 1.9 MPa. Steam in the reaction vessel was released for 70 minutes with retaining the internal pressure of 1.9 MPa. Then, the internal temperature was increased to 235° C. over 110 minutes, and, at the same time, the internal pressure was decreased to 0.1 MPa. Then, the internal pressure in the reaction system was continuously decreased down to 80 kPa over 10 minutes. Then, the reaction temperature was continuously increased to 260° C. and the reaction was continued for 80 minutes, to obtain a polyamide. Table 1 shows physical properties of the polyamide. A stretched film used for the remanent polarization measurement was prepared by the following method. A polyamide was molded with a single-screw extruder (screw diameter 20 mm, L/D:25, screw type: full flight) by the T-die method under conditions of a cylinder temperature of 190 to 200° C., a T-die temperature of 195° C., and a screw rotating speed of 70 rpm, to obtain a film having a thickness of about 200 μm. The film was preheated at 60° C. for 20 seconds and then stretched with a biaxially stretching machine, supplied by Toyo Seiki Seisaku-Sho, Ltd., in longitudinal direction and horizontal direction concurrently at a longitudinal stretch ratio of 3.5 and at a horizontal stretch ratio of 3.5. Then, the stretched film was heat-treated in an atmosphere of 100 ° C. for 10 seconds while retaining the tension state of the stretched film, to obtain a stretched film having a thickness of 10 to 20 μm. The obtained stretched film was used. A 5 mm×8 mm aluminum was vacuum evaporated by using a JEE-400 type vacuum evaporator supplied by JEOL, Ltd., as a vacuum evaporator, to obtain electrodes.

Example 2

A polyamide was obtained in the same manner as in Example 1 except that EMEROX1144 supplied by Cognis (dicarboxylic acid 99.97%, azelaic acid 93.3 mol %) was used as a dicarboxylic acid. Table 1 shows physical properties of the polyamide. A stretched film used for the remanent polarization measurement was prepared in the same manner as in Example 1.

Example 3

A polyamide was obtained in the same manner as in Example 1 except that a mixture of EMEROX1144 supplied by Cognis (dicarboxylic acid 99.97%, azelaic acid 93.3 mol %)/isophthalic acid (molar ratio: 80/20) was used as a dicarboxylic acid. Table 1 shows physical properties of the polyamide. A stretched film used for the remanent polarization measurement was prepared in the same manner as in Example 1.

Example 4

A polyamide was obtained in the same manner as in Example 2 except that a mixture of 2-methyl-1,5-pentanediamine/metaxylylene diamine (molar ratio 80/20) was used as a diamine component. Table 1 shows physical properties of the polyamide. A stretched film used for the remanent polarization measurement was prepared in the same manner as in Example 1.

Example 5

A polyamide was obtained in the same manner as in Example 1 except that a mixture of EMEROX1144 supplied by cognis (dicarboxylic acid 99.97%, azelaic acid 93.3 mol %)/isophthalic acid (molar ratio: 80/20) was used as a dicarboxylic acid and that a mixture of 2-methyl-1,5-pentanediamine/1,3-bis(aminomethyl)cyclohexane (molar ratio 70/30) was used as a diamine component. Table 2 shows physical properties of the polyamide. A stretched film used for the remanent polarization measurement was prepared in the same manner as in Example 1.

Comparative Example 1

A polyamide was obtained in the same manner as in Example 1 except that sebacic acid was used as a dicarboxylic acid. Table 2 shows physical properties of the polyamide. A stretched film used for the remanent polarization measurement was prepared in the same manner as in Example 1.

Comparative Example 2

A polyamide was obtained in the same manner as in Example 2 except that 1,6-diaminohexane was used as a diamine component. Table 2 shows physical properties of the polyamide. A stretched film used for the remanent polarization measurement was prepared in the same manner as in Example 1.

Comparative Example 3

Nylon-11 (supplied by Atofina, trade name: Rilsan B) was similarly measured for physical properties. Table 2 shows the physical properties. A stretched film used for the remanent polarization measurement was prepared by the following method. A sheet having a thickness of about 50 μm was obtained with a single screw extruder (screw diameter: 20 mm, L/D:25, screw type: full flight) by the T-die method under conditions of a cylinder temperature of 250–265° C., a T-die temperature of 260° C., and a screw rotating speed of 50 rpm. The sheet was preheated at 90° C. for several seconds and then uniaxially stretched with a biaxially stretching machine, supplied by Toyo Seiki Seisaku-Sho, Ltd., in an extrusion direction at a stretch ratio of 3.5. Then, the stretched film was heat-treated in an atmosphere of 180° C. for 10 seconds while retaining the tension state of the stretched film, to obtain a stretched film having a thickness of 15 to 20 μm. The obtained stretched film was used.

Comparative Example 4

Polymetaxylylene adipamide (supplied by Mitsubishi Gas Chemical Co., Inc., trade name: MX Nylon) was similarly measured for physical properties. Table 3 shows the physical properties. A stretched film used for the remanent polarization measurement was prepared by the following method. A sheet having a thickness of about 50 μm was obtained in the same manner as in Comparative Example 3. The sheet was preheated at 95° C. for several seconds and then uniaxially stretched with a biaxially stretching machine, supplied by Toyo Seiki Seisaku-Sho, Ltd., in an extrusion direction at a stretch ratio of 4.0. Then, the stretched film was heat-treated in an atmosphere of 200° C. for 10 seconds while retaining the tension state of the stretched film, to obtain a stretched film having a thickness of 15 to 20 μm. The obtained stretched film was used.

Comparative Example 5

A resin (supplied by DuPont, tradename: Selar PA 3426) obtained by copolymerizing polyhexamethylene isophthalamide with 30 mol % of terephthalamide was similarly measured for physical properties. Table 3 shows the physical properties. A stretched film used for the remanent polarization measurement was prepared by the following method. A sheet having a thickness of about 50 μm was obtained in the same manner as in Comparative Example 3. The sheet was preheated at 140° C. for several seconds and then uniaxially stretched with a biaxially stretching machine, supplied by Toyo Seiki Seisaku-Sho, Ltd., in an extrusion direction at a stretch ratio of 3.0. Then, the stretched film was heat-treated in an atmosphere of 180° C. for 10 seconds while retaining the tension state of the stretched film, to obtain a stretched film having a thickness of 15 to 20 μm. The obtained stretched film was used.

Comparative Example 6

A nylon 6/66/610/12 resin (supplied by Toray Industries, Inc., trade name: Amilan CM8000) was similarly measured for physical properties. Table 3 shows the physical properties. A stretched film used for the remanent polarization measurement was prepared by the following method. A sheet having a thickness of about 50 μm was obtained in the same manner as in Comparative Example 3. The sheet was preheated at 90° C. for several seconds and then uniaxially stretched with a biaxially stretching machine, supplied by Toyo Seiki Seisaku-Sho, Ltd., in an extrusion direction at a stretch ratio of 3.0. Then, the stretched film was heat-treated in an atmosphere of 200° C. for 10 seconds while retaining the tension state of the stretched film, to obtain a stretched film having a thickness of 15 to 20 μm. The obtained stretched film was used.

TABLE 1

|  | Example 1 | Example 2 | Example 3 | Example 4 |
|---|---|---|---|---|
| Remanent polarization (mC/m$^2$) | 60 | 58 | 60 | 55 |
| ηr | 2.5 | 2.3 | 2.1 | 1.9 |
| Tm (° C.) | 122 | 119 | — | 116 |
| Tg (° C.) | 42 | 42 | 54 | 41 |
| ΔHc (J/g) | 0 | 0 | 0 | 0 |
| Solubility |  |  |  |  |
| Methanol | ○ | ○ | ○ | ○ |
| Ethanol | ○ | ○ | ○ | ○ |
| 2-propanol | ○ | ○ | ○ | ○ |

TABLE 2

|  | Example 5 | Comparative Example 1 | Comparative Example 2 | Comparative Example 3 |
|---|---|---|---|---|
| Remanent polarization (mC/m$^2$) | 50 | 27 | 15 | 28 |
| ηr | 1.8 | 2.1 | 2.2 | 2.3 |
| Tm (° C.) | — | 143, 164 | 211 | 188 |
| Tg (° C.) | 47 | 39 | 37 | 43 |
| ΔHc (J/g) | 0 | 0 | 48 | 38 |
| Solubility |  |  |  |  |
| Methanol | ○ | Δ | x | x |
| Ethanol | ○ | Δ | x | x |
| 2-propanol | ○ | x | x | x |

TABLE 3

|  | Comparative Example 4 | Comparative Example 5 | Comparative Example 6 |
|---|---|---|---|
| Remanent polarization (mC/m$^2$) | 21 | 32 | 17 |
| ηr | 2.5 | 1.9 | 2.5 |
| Tm (° C.) | 240 | — | 143 |
| Tg (° C.) | 85 | 125 | 44 |
| ΔHc (J/g) | 46 | 0 | 5 |
| Solubility |  |  |  |
| Methanol | x | x | ○ |
| Ethanol | x | x | ○ |
| 2-propanol | x | x | ○ |

Examples of the resin composition will be shown hereinafter, while the present invention shall not be limited to these Examples. Measurements of physical properties were carried out by the following methods.

(1) Volume Resistivity

Measured according to the method of JIS K6911.

(2) Damping Properties

The damping properties were evaluated by a loss modulus of a dynamic viscoelasticity. The higher the loss modulus is, the higher the damping properties are. A resin composition was molded at 200° C. by hot pressing to obtain a sheet having a thickness of about 1 mm. The sheet was cut to obtain a specimen having a size of 5 mm×25 mm. The specimen was measured with a dynamic viscoelasticity measuring device (supplied by Toyo Seiki Seisaku-Sho, Ltd., Rheolograph-Solid S-1) under conditions of 0–100° C., a temperature-increasing rate of 2° C./minute and a frequency of 13 Hz, to obtain a loss modulus. The damping properties were evaluated by a peak value of the obtained loss modulus.

Example 6

90 parts by weight of the polyamide of Example 2 and 10 parts by weight of an electrically conductive carbon powder (supplied by Ketjenblack International Company, trade name: KETJENBLACK EC) were kneaded with a twin-screw extruder at 240° C., to obtain a resin composition. Table 4 shows physical properties of the resin composition.

Example 7

76.5 parts by weight of the polyamide of Example 2, 15 parts by weight of an electrically conductive carbon powder (supplied by Ketjenblack International Company, trade name: KETJENBLACK EC) and 8.5 parts by weight of an anion type surfactant-containing polyether copolyester (supplied by Takemoto oil&fat Co., Ltd., trade name: MGA-902)

were kneaded with a twin-screw extruder at 240° C., to obtain a resin composition. Table 4 shows physical properties of the resin composition.

Example 8

90 parts by weight of the polyamide of Example 3 and 10 parts by weight of an electrically conductive carbon powder (supplied by Ketjenblack International Company, trade name: KETJENBLACK EC) were kneaded with a twin-screw extruder at 240° C., to obtain a resin composition. Table 4 shows physical properties of the resin composition.

Example 9

90 parts by weight of the polyamide of Example 3 and 10 parts by weight of an electrically conductive carbon fiber (supplied by MITSUBISHI CHEMICAL CORPORATION, trade name: DIALEAD K223SE) were kneaded with a twin-screw extruder at 240° C., to obtain a resin composition. Table 4 shows physical properties of the resin composition.

Example 10

81 parts by weight of the polyamide of Example 3, 9 parts by weight of a plasticizer (supplied by Fuji Amide Chemical Co., Ltd., trade name: TOPCIZER No.5) and 10 parts by weight of an electrically conductive carbon (supplied by Ketjenblack International Company, trade name: KETJENBLACKEC) were kneaded with a twin-screw extruder at 240° C., to obtain a resin composition. Table 4 shows physical properties of the resin composition.

Example 11

80 parts by weight of the polyamide of Example 3 and 20 parts by weight of an electrically conductive carbon powder (supplied by SEC Corporation, trade name: SNO-10) were kneaded with a twin-screw extruder at 240° C., to obtain a resin composition. Table 4 shows physical properties of the resin composition.

Example 12

63 parts by weight of the polyamide of Example 2, 7 parts by weight of an electrically conductive carbon powder (supplied by Ketjenblack International Company, trade name: KETJENBLACK EC) and 30 parts by weight of mica (supplied by Yamaguchi mica co., Ltd., trade name: B-82) were kneaded with a twin-screw extruder at 240° C., to obtain a resin composition. Table 4 shows physical properties of the resin composition.

Comparative Example 7

The polyamide of Example 2 was used to prepare a specimen. Table 4 shows physical properties thereof.

Comparative Example 8

90 parts by weight of the polyamide of Example 2 and 10 parts by weight of titanium oxide (supplied by Ishihara Sangyo Kaisha, Ltd., trade name: Tipaque CR-60) were kneaded with a twin-screw extruder at 240° C., to obtain a resin composition. Table 4 shows physical properties of the resin composition.

Comparative Example 9

The polyamide of Example 3 was used to prepare a specimen. Table 4 shows physical properties thereof.

Comparative Example 10

Nylon 6 (supplied by Ube Industries, Ltd., trade name: UBE Nylon 1024B) was used to prepare a specimen. Table 4 shows physical properties thereof. A stretched film was polarized in an electric field of 200 MV/m and the remanent polarization at this time was 14 mC/m$^2$. The above stretched film used for the remanent polarization measurement was prepared by the following method. A film having a thickness of about 50 μm was obtained with a single screw extruder (screw diameter 20 mm, L/D:25, screw type: full flight) by the T-die method under conditions of a cylinder temperature of 240–250° C., a T-die temperature of 245° C. and a screw rotating speed of 50 rpm. The film was preheated at 90° C. for several seconds and then uniaxially stretched with a biaxially stretching machine, supplied by Toyo Seiki Seisaku-Sho, Ltd., in an extrusion direction at a stretch ratio of 3.5. Then, the stretched film was heat-treated in an atmosphere of 200° C. for 10 seconds while retaining the tension state of the stretched film, to obtain a stretched film having a thickness of 15 to 20 μm. The obtained stretched film was used. Further, as a sheet used for the loss modulus measurement, a resin composition was molded by hot pressing at 260° C., thereby preparing a specimen similar to that of Example 6. Table 4 shows physical properties.

Comparative Example 11

90 parts by weight of Nylon 6 (supplied by Ube Industries, Ltd., trade name: UBE Nylon 1024B) and 10 parts by weight of an electrically conductive carbon powder (supplied by Ketjenblack International Company, trade name: KETJENBLACK EC) were kneaded with a twin-screw extruder at 260° C. Table 4 shows physical properties.

Comparative Example 12

The polyamide of Comparative Example 6 was used to prepare a specimen. Table 4 shows physical properties thereof.

Comparative Example 13

90 parts by weight of the polyamide of Comparative Example 6 and 10 parts by weight of an electrically conductive carbon powder (supplied by Ketjenblack International Company, trade name: KETJENBLACK EC) were kneaded with a twin-screw extruder at 260° C. Table 4 shows physical properties.

TABLE 4

| | Volume resistivity (Ω · cm) | Peak value of loss modulus (MPa) |
|---|---|---|
| Example 6 | 6.4E+6 | 580 |
| Example 7 | 4.5E+4 | 490 |
| Example 8 | 6.7E+6 | 530 |
| Example 9 | 1.7E+8 | 500 |
| Example 10 | 4.1E+5 | 600 |
| Example 11 | 2.3E+10 | 690 |
| Example 12 | 4.6E+8 | 1,000 |
| Comparative Example 7 | 3.2E+14 | 340 |

TABLE 4-continued

| | Volume resistivity (Ω · cm) | Peak value of loss modulus (MPa) |
|---|---|---|
| Comparative Example 8 | 2.6E+14 | 450 |
| Comparative Example 9 | 2.0E+14 | 450 |
| Comparative Example 10 | 8.2E+14 | 180 |
| Comparative Example 11 | 1.7E+6 | 210 |
| Comparative Example 12 | 6.0E+14 | 210 |
| Comparative Example 13 | 2.3E+6 | 220 |

As shown in table 4, the resin compositions of Examples 6–12, provided by the present invention, showed higher loss modulus than the resin compositions of Comparative Examples 7–9 and were high in damping properties. Further, in Comparative Examples 10–13 in which the polyamides other than the polyamide of the present invention were used, although the electric conductive materials were added, the resin compositions did not show high loss modulus and were low in damping properties.

Effect of the Invention

The polyamide of the present invention has a large ferroelectricity and excellent solubility in a general-purpose solvent and can be used as a useful material for applications such as a sensor, an actuator, a memory, a light-control device, a storage material, a damping material and a noise absorbing material. Therefore, the industrial meaning of the present invention is significant. Further, the resin composition of the present invention does not require a polarization treatment so that it can be simply produced. The resin composition of the present invention is a lightweight material having higher damping properties, so that the industrial meaning of the present invention is significant.

What is claimed is:

1. A polyamide obtained by polycondensation of a diamine component containing 2-methyl-1,5-pentanediamine and a dicarboxylic acid component containing azelaic acid, wherein the diamine component contains at least 70 mol % of 2-methyl-1,5-pentanediamine and the dicarboxylic acid component contains at least 70 mol % of azelaic acid and the polyamide is obtained by polycondensation of only the diamine component and the dicarboxylic acid component, comprising the following properties of (1) to (4),
(1) when a stretched film is polarized in an electric field of 200 MV/m, a remanent polarization is at least 30 mC/m$^2$,
(2) the relative viscosity of a 1 g/dl solution of the polyamide in 96% concentrated sulfuric acid at 25° C. is 1.3 to 5.0,
(3) the glass transition temperature, measured with a differential scanning calorimeter, of the polyamide is 80° C. or less and a calorific value at a cooling crystallization exotherm peak is 5J/g or less, and
(4) the polyamide is soluble in an amount of at least 5 mass % at 25° C. in at least one member selected from the group consisting of methanol, ethanol and 2-propanol.

2. The polyamide according to claim 1,
wherein the diamine component contains less than 50 mol % of at least one member selected from the group consisting of 1,5-pentanediamine, 1,7-heptanediamine, 1,9-nonanediamine, metaxylylene diamine and 1,3-bis(aminomethyl)cyclohexane.

3. The polyamide according to claim 1,
wherein the dicarboxylic acid component contains less than 50 mol % of at least one member selected from the group consisting of glutaric acid, suberic acid, undecanedioic acid, isophthalic acid and 1,3-cyclohexanedicarboxylic acid.

4. The polyamide according to claim 1,
wherein the diamine component contains at least 90 mol % of 2-methyl-1,5-pentanediamine and the dicarboxylic acid component contains at least 90 mol % of azelaic acid.

5. A resin composition containing the polyamide as recited in claim 1 and an electrically conductive material.

6. The resin composition according to claim 5,
which has a volume resistivity of $10^{12}$ Ω·cm or less.

7. The resin composition according to claim 5,
wherein the electrically conductive material is an inorganic electrically conductive material or an organic electrically conductive material.

8. The resin composition according to claim 5,
which further contains a filler for vibrational energy absorption.

9. The resin composition according to claim 8,
wherein the filler is at least one member selected from the group consisting of mica flakes, glass pieces, a glass fiber, a carbon fiber, calcium carbonate, barite and precipitated barium sulfate.

10. The polyamide according to claim 1,
wherein the diamine component contains less than 30 mol %, based on the entire diamine component, of metaxylylene diamine and/or 1,3-bis(aminomethyl) cyclohexane.

11. The polyamide according to claim 1,
wherein the dicarboxylic acid component contains less than 30 mol %, based on the entire dicarboxylic acid component, of isophthalic acid.

* * * * *